(12) United States Patent
Juni (10) Patent No.: US 7,826,699 B2
(45) Date of Patent: Nov. 2, 2010

(54) OPTICAL WAVEGUIDE FOR TOUCH PANEL AND TOUCH PANEL USING THE SAME

(75) Inventor: Noriyuki Juni, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 248 days.

(21) Appl. No.: 12/255,910

(22) Filed: Oct. 22, 2008

(65) Prior Publication Data

US 2009/0102815 A1  Apr. 23, 2009

Related U.S. Application Data

(60) Provisional application No. 60/985,725, filed on Nov. 6, 2007.

(30) Foreign Application Priority Data

Oct. 23, 2007  (JP) .............................. 2007-275266

(51) Int. Cl.
*G02B 6/32* (2006.01)
*G02B 6/10* (2006.01)
*G06F 3/042* (2006.01)

(52) U.S. Cl. ........................... 385/33; 385/43; 385/131; 345/175; 345/176

(58) Field of Classification Search .................. 385/12, 385/33, 43, 129–132; 345/173, 175, 176
See application file for complete search history.

(56) References Cited

U.S. PATENT DOCUMENTS

| 6,181,842 | B1* | 1/2001 | Francis et al. ................. 385/14 |
| 7,520,050 | B2* | 4/2009 | Graham ....................... 29/825 |
| 7,546,009 | B2* | 6/2009 | Kukulj et al. ................. 385/33 |
| 2004/0201579 | A1 | 10/2004 | Graham | |
| 2005/0089298 | A1 | 4/2005 | Maxwell et al. | |
| 2009/0237375 | A1* | 9/2009 | Khan et al. .................. 345/175 |

* cited by examiner

*Primary Examiner*—Daniel Petkovsek
(74) *Attorney, Agent, or Firm*—Westerman, Hattori, Daniels & Adrian, LLP (57) ABSTRACT

An optical waveguide for a touch panel and a touch panel using the same. A lens portion 30 formed in an end portion of each light-emitting core 3 and each light-receiving core 3 has a tapered portion 31 such that the width thereof gradually increases toward an end surface thereof. The end surface is an arcuately curved surface 32 which bulges outwardly and has a radius of curvature R. When the tapered portion 31 has a length L not less than 800 μm, a taper angle α is in the range of 2 to 20 degrees, and (A) is satisfied. When the tapered portion 31 has a length L not less than 400 μm but less than 800 μm, the taper angle α is in the range of 4 to 16 degrees, and condition (A) is satisfied.

$$0.5 \times L \times \tan(\alpha/2) < R < 2.5 \times L \times \tan(\alpha/2). \tag{A}$$

6 Claims, 6 Drawing Sheets

OPTICAL WAVEGUIDE FOR TOUCH PANEL AND TOUCH PANEL USING THE SAME

RELATED APPLICATIONS

This application claims the benefit of U.S. Provisional Application No. 60/985,725, filed Nov. 6, 2007, which is hereby incorporated by reference.

BACKGROUND OF THE INVENTION

1. Field of the Invention

The present invention relates to an optical waveguide fox a touch panel and a touch panel using the same.

2. Description of the Related Art

Touch panels are input devices for operating an apparatus by directly touching a display screen of a liquid crystal display device or the like with a finger, a purpose-built stylus or the like, and include a display which displays operation details and the like, and a detection means which detects the position (coordinates) of a portion of the display screen of the display touched with the finger or the like. Information about the touch position detected by the detection means is sent in the form of a signal to the apparatus, which in turn performs an operation and the like displayed on the touch position. Examples of the apparatus employing such a touch panel include ATMs in banking facilities, ticket vending machines in stations, portable game machines, and the like.

A detection means employing an optical waveguide is proposed as the detection means for detecting the finger touch position and the like on the above-mentioned touch panel (see, for example, U.S. 2004/0201579A1). Specifically, the touch panel includes optical waveguides provided around a periphery of a display screen of a rectangular display, and is configured to emit a multiplicity of light beams parallel to the display screen of the display from an optical waveguide provided on one side portion of the display screen toward the other side portion, and to cause the light beams to enter an optical waveguide provided on the other side portion. These optical waveguides cause the light beams to travel in a lattice form on the display screen of the display. When a portion of the display screen of the display is touched with a finger in this state, the finger blocks some of the light beams. Therefore, the light-receiving optical waveguide senses a light blocked portion, whereby the position of the portion touched with the finger is detected.

The light beams emitted from an optical waveguide directly into the air diverge radially. There has been proposed a light-emitting optical waveguide including a core having an end portion formed in a lens-shaped configuration so as to suppress the divergence of the emitted light beams (see, for example, U.S. 2005/0089298A1).

For a touch panel using the above-mentioned optical waveguides, it is necessary that the light beams emitted from the light-emitting optical waveguide into the air be incident on the core of the light-receiving optical waveguide. In this case, when the emitted light beams spread too wide, there is a low probability that the light beans enter the core of the light-receiving optical waveguide, which results in low optical transmission efficiency. To overcome such a problem, it is contemplated to form an end portion of the core in a lens-shaped configuration to narrow down the emitted light beams by the use of the technique disclosed in U.S. 2005/0089298A1 described above. However, narrowing down the emitted light beams reduces the size of a light-receiving region too much and makes it difficult for the core of the light-receiving optical waveguide to receive the light beams (or makes it impossible for the core of the light-receiving optical waveguide to receive the light beams if the core of the light-receiving optical waveguide is deviated from its proper position even slightly).

SUMMARY OF THE INVENTION

In view of the foregoing, it is an object of the present invention to provide an optical waveguide for a touch panel which appropriately emits and receives light beams, and a touch panel using the same.

To accomplish the above-mentioned object, a first aspect of the present invention is intended for an optical waveguide for a touch panel comprising: a body; a plurality of cores formed on a predetermined portion of a surface of the body, the plurality of cores including a light-emitting core and a light-receiving core; and an over cladding layer formed on the surface of said body so as to cover the plurality of cores, the optical waveguide being provided along a peripheral portion of a display screen of a display of the touch panel, the light-emitting core including an end portion positioned in a first side portion of the display screen of said display, the light-receiving core including an end portion positioned in a second side portion of the display screen of said display, each of the end portion of the light-emitting core and the end portion of the light-receiving core being formed as a lens portion, the lens portion having a tapered portion such that the width thereof gradually increases toward an end surface thereof, said end surface being formed as an arcuately curved surface in plan view which bulges outwardly, wherein the length (L) of said tapered portion, a taper angle ($\alpha$) and the radius (R) of curvature of the arcuately curved surface in plan view satisfy the following conditions (a) to (c):

(a) $800\ \mu m \leq L$
(b) $2° \leq \alpha \leq 20°$
(c) $0.5 \times L \times \tan(\alpha/2) < R < 2.5 \times L \times \tan(\alpha/2)$ where L is in $\mu m$, $\alpha$ is in degrees, and R is in $\mu m$.

A second aspect of the present invention is intended for an optical waveguide for a touch panel comprising: a body; a plurality of cores formed on a predetermined portion of a surface of the body, the plurality of cores including a light-emitting core and a light-receiving core; and an over cladding layer formed on the surface of said body so as to cover the plurality of cores, the optical waveguide being provided along a peripheral portion of a display screen of a display of the touch panel, the light-emitting core including an end portion positioned in a first side portion of the display screen of said display, the light-receiving core including an end portion positioned in a second side portion of the display screen of said display, each of the end portion of the light-emitting core and the end portion of the light-receiving core being formed as a lens portion, the lens portion having a tapered portion such that the width thereof gradually increases toward an end surface thereof, said end surface being formed as an arcuately curved surface in plan view which bulges outwardly, wherein the length (L) of said tapered portion, a taper angle ($\alpha$) and the radius (R) of curvature of the arcuately curved surface in plan view satisfy the following conditions (d) to (f):

(d) $400\ \mu m \leq L < 800\ \mu m$
(e) $4° \leq \alpha \leq 16°$
(f) $0.5 \times L \times \tan(\alpha/2) < R < 2.5 \times L \times \tan(\alpha/2)$ where L is in $\mu m$, $\alpha$ is in degrees, and R is in $\mu m$.

A third aspect of the present invention is intended for a touch panel comprising an optical waveguide for a touch panel as recited in the above-mentioned first or second aspect, the optical waveguide being provided along a peripheral portion of a display screen of a display of the touch panel, wherein the light-emitting core includes an end portion positioned in a first side portion of the display screen of said display, and the light-receiving core includes an end portion positioned in a second side portion of the display screen of said display.

To overcome the above-mentioned problems, the present inventor has made studies of the configuration of the lens portion formed in the end portion of each core and the like. As a result, the present inventor has discovered that, when the lens portion has a tapered portion such that the width thereof gradually increases toward the end surface thereof which in turn is formed as the arcuately curved surface in plan view which bulges outwardly and the length (L) of the above-mentioned tapered portion, the taper angle ($\alpha$) and the radius (R) of curvature of the arcuately curved surface in plan view satisfy the above-mentioned conditions (a) to (c) or (d) to (f), the horizontal divergence (the divergence as seen in plan view) of the light beams emitted from the end portion of each core is suppressed by refraction through the above-mentioned lens portion so that the light-receiving region has an appropriate area (neither too wide nor too narrow). Further, the present inventor has discovered that the end surface of the light-receiving core is wide and easily receives the light beams because of the configuration of the above-mentioned lens portion. Thus, the present inventor has attained the present invention.

In the optical waveguide for the touch panel according to the first and second aspects of the present invention, each of the end portion of the light-emitting core and the end portion of the light-receiving core is formed as the lens portion having the above-mentioned specific configuration and specific dimensions. Thus, the light beams emitted from the end portion of the core are appropriate in divergence by refraction through the above-mentioned lens portion, and the light beams incident on the end portion of the core easily enter the core because of the configuration of the above-mentioned lens portion. As a result, the optical waveguide for the touch panel achieves optical transmission between the light-emitting core and the light-receiving core with appropriate optical transmission efficiency.

The touch panel according to the present invention includes the optical waveguide for the touch panel according to the first or second aspect. This achieves the appropriate divergence of the light beams emitted from the end portion of each core. When the display screen of the display is touched with a finger, the touch panel precisely detects the position of a portion touched with the finger.

DETAILED DESCRIPTION OF PREFERRED EMBODIMENTS

Preferred embodiments according to the present invention will now be described in detail with reference to the drawings.

Figure 1A:
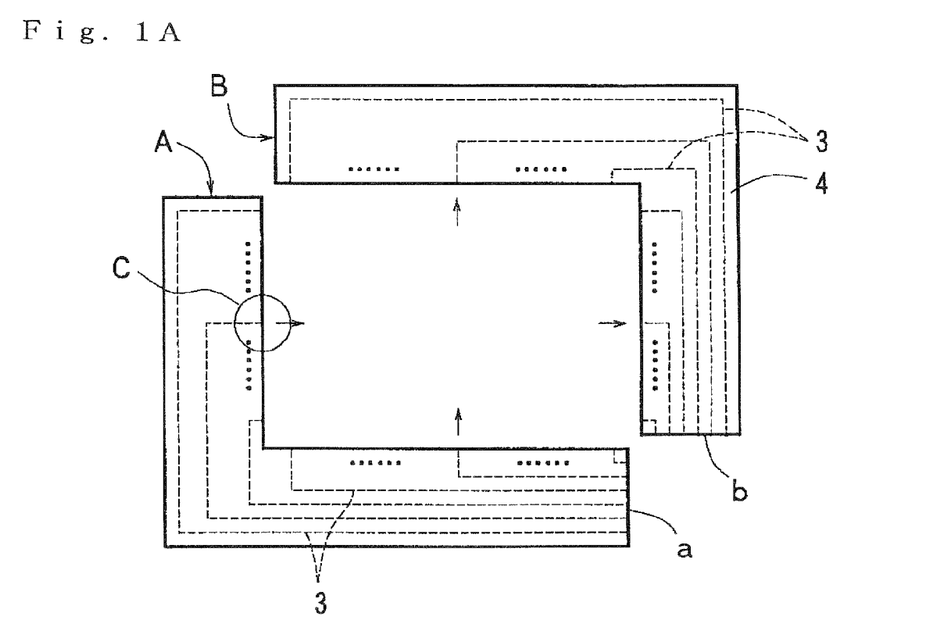
FIG. 1A is a plan view schematically showing an optical waveguide for a touch panel according to a first preferred embodiment of the present invention.
Figure 1B:
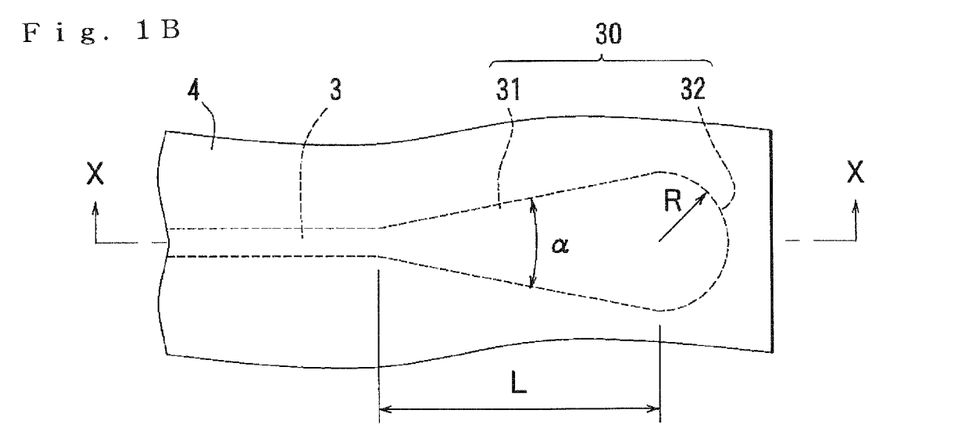
FIG. 1B is an enlarged view of an end portion of a core enclosed with a circle C of FIG. 1A.
Figure 1C:
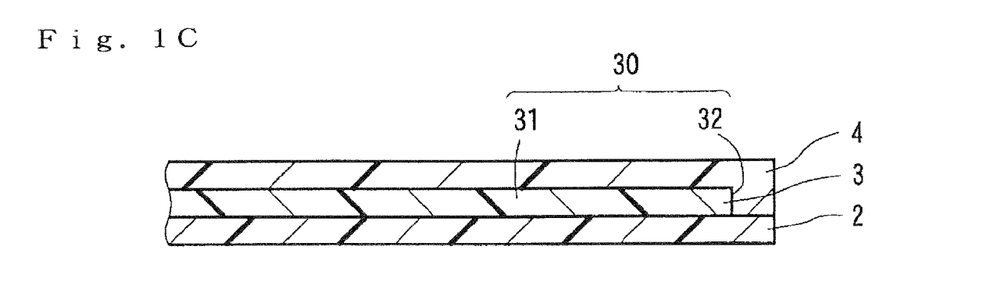
FIG. 1C is a sectional view taken along the line X-X of FIG. 1B.

FIGS. 1A to 1C illustrate an optical waveguide for a touch panel according to a first preferred embodiment of the present invention. The optical waveguide for the touch panel according to the first preferred embodiment includes two L-shaped optical waveguides A and B. Of the two, the L-shaped optical waveguide A is a light-emitting optical waveguide (see arrows of FIG. 1A), and the L-shaped optical waveguide B is a light-receiving optical waveguide (see arrows of FIG. 1A). Each of the two L-shaped optical waveguides A and B includes an under cladding layer (body) 2 formed in an L-shaped configuration, and a plurality of cores 3 serving as a passageway for light and formed on predetermined portions of the surface of the under cladding layer 2, the plurality of cores 3 being patterned to extend from first end edges a and b of the above-mentioned L-shaped configuration to inner end edge portions of the L-shaped configuration [on the display screen side of a display 11 (see FIG. 2)] and to be arranged in a parallel, equally spaced relationship. Each of the two L-shaped optical waveguides A and B further includes an over cladding layer 4 formed on the surface of the above-mentioned under cladding layer 2 so as to cover the cores 3. The number of cores 3 formed in the light-emitting L-shaped optical waveguide A is equal to the number of cores 3 formed in the light-receiving L-shaped optical waveguide B. An end portion of each of the cores 3 which is located in the inner end edge portion of the above-mentioned L-shaped configuration is formed as a lens portion 30 having the shape of a head portion of what is called a rice paddle as shown in FIG. 1B [which is an enlarged view of a circular portion C of FIG. 1A]. This lens portion 30 is flat as seen in side view, as shown in FIG. 1C. The lens portion 30 will be described later in detail. In the first preferred embodiment, the above-mentioned lens portion 30 is positioned inside the over cladding layer 4. In FIG. 1A, the cores 3 are indicated by broken lines, and the thickness of the broken lines indicates the thickness of the cores 3. Also, the number of cores 3 are shown as abbreviated by using dots.

Figure 2:
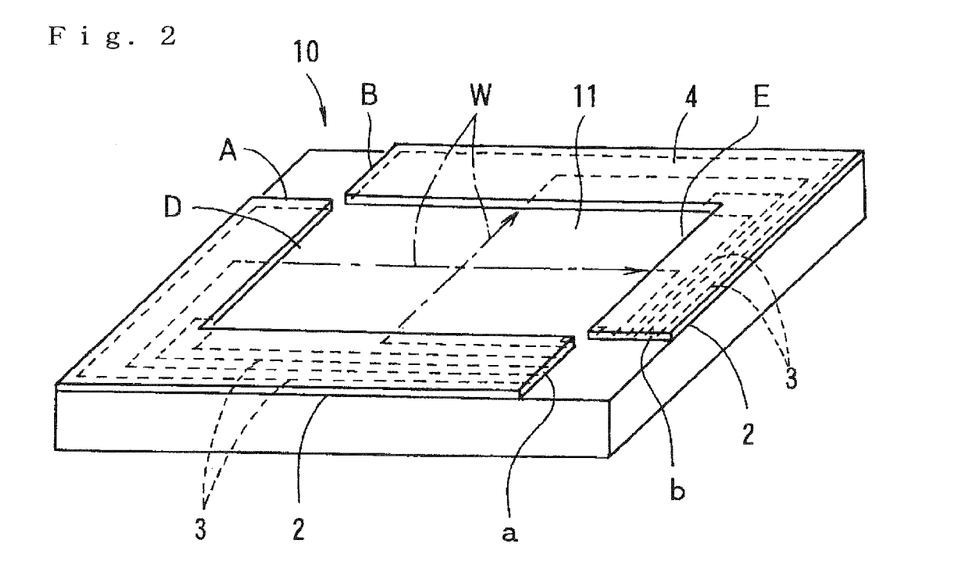
FIG. 2 is a perspective view schematically showing a touch panel using the above-mentioned optical waveguide for the touch panel.

As illustrated in FIG. 2, the above-mentioned two L-shaped optical waveguides A and B are provided along the rectangular shape of the periphery of the display screen of the rectangular display 11 of a touch panel 10 so as to surround the display screen of the rectangular display 11. A light source (not shown) is connected to the cores 3 on the first end edge a of the L-shaped optical waveguide A which emits light beams W, and a detector (not shown) is connected to the cores 3 on the first end edge b of the L-shaped optical waveguide B which receives the light beams W. More specifically, in conditions as shown in FIG. 2, the end portions [the lens portion 30 shown in FIG. 1B] of the cores 3 which emit the light beams W are positioned in an L-shaped portion (a first side portion) D of the L-shaped optical waveguide A along the periphery of the display screen of the display 11, and the end portions [the lens portion 30 shown in FIG. 1B] of the cores 3 which receive the light beams W are positioned in an L-shaped portion (a second side portion) E of the L-shaped optical waveguide B along the periphery of the display screen of the display 11, the L-shaped portion E being opposed to the above-mentioned L-shaped portion D. The end surfaces [the end surface (or arcuately curved surface 32 in plan view) of the lens portion 30 shown in FIG. 1B] of the respective cores 3 which emit the light beams W are in face-to-face relationship with the end surfaces [the end surface (or arcuately curved surface 32 in plan view) of the lens portion 30 shown in FIG. 1B] of the respective cores 3 which receive the light beams W. This condition is shown in perspective view in FIG. 2. In FIG. 2 as in FIG. 1A, the cores 3 are indicated by broken lines, and the thickness of the broken lines indicates the thickness of the cores 3. Also, the number of cores 3 are shown as abbreviated by using dots. Only some of a multiplicity of light beams W are shown in FIG. 2 for ease of understanding.

The lens portion 30 formed in the end portion of each of the above-mentioned cores 3 and having the shape of a head portion of what is called a rice paddle will be described in further detail. As shown in FIG. 1B, the above-mentioned lens portion 30 has a tapered portion 31 such that the width thereof gradually increases toward the end surface thereof, and the end surface of each of the cores 3 is formed as the arcuately curved surface 32 in plan view which bulges outwardly. The dimensions of the lens portion 30 formed in the end portion of each of the above-mentioned cores 3 are as follows:

(1) When the above-mentioned tapered portion 31 has a length (L) of not less than 800 μm, a taper angle (α) is in the range of 2 to 20 degrees, and the length (L) of the above-mentioned tapered portion 31, the taper angle (α) and the radius (R) of curvature of the arcuately curved surface 32 in plan view satisfy the following condition (A). The following condition (A) is an expression obtained by the present inventor after repeated experiments. In this case [where the length (L) of the tapered portion 31 is not less than 800 μm], there is no upper limit to the length (L) of the tapered portion 31. However, the excessively great length (L) of the tapered portion 31 requires much space in the peripheral portion of the display screen of the display 11 (see FIG. 2) of the touch panel 10, and does not make sense in terms of optical transmission.

(2) When the above-mentioned tapered portion 31 has a length (L) of less than 800 μm, the length (L) of the tapered portion 31 is set at not less than 400 μm (set so as not to fall below 400 μm), the taper angle (α) is in the range of 4 to 16 degrees, and the following condition (A) is satisfied.

$$0.5 \times L \times \tan(\alpha/2) < R < 2.5 \times L \times \tan(\alpha/2) \quad (A)$$

[where L is in μm, a is in degrees, and R is in μm]

Figure 3A:
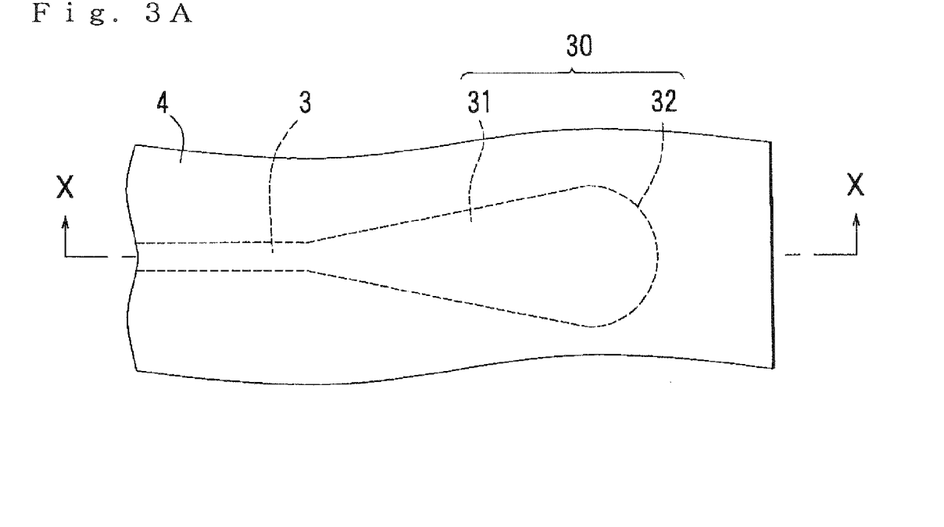
FIG. 3A is an enlarged plan view schematically showing the transmission of light beams in the above-mentioned optical waveguide for the touch panel when the light beams are emitted.

In the L-shaped optical waveguide A which emits the light beams W, as illustrated in FIG. 3A, the horizontal divergence (the divergence along the under cladding layer 2) of the light beams w emitted from each of the cores 3 is suppressed by refraction through the lens portion 30 formed in the end portion of each of the cores 3. Specifically, the light beams W travel in each of the cores 3 while being reflected frequently repeatedly, and are reflected in the tapered portion 31 of the lens portion 30 having the shape of a head portion of a rice paddle so as to be easily directed toward the arcuately curved surface 32 in plan view at the extreme tip [i.e., the angles of reflection are adjusted by adjusting the taper angle (α) of the tapered portion 31]. The number of times of reflection decreases as the light beams W travel along an increasing-width tip portion of the lens portion 30, and the light beams W emitted from the arcuately curved surface 32 in plan view at the extreme tip are close to parallel light beams as seen in plan view because of the configuration of the arcuately curved surface 32 in plan view. In this manner, the horizontal divergence of the emitted light beams W is suppressed by refraction through the lens portion 30. Subsequently, the light beams W pass through an end portion [see FIG. 1C] of the over cladding layer 4 which covers the front of the above-mentioned lens portion 30, and thereafter travel along the display screen of the above-mentioned display 11 (see FIG. 2). The light beams W traveling over the display screen of the above-mentioned display 11 neither spread too wide nor narrow down by reflection through the above-mentioned lens portion 30. This provides an appropriate area of the light-receiving region of the L-shaped optical waveguide B which receives the light beams W.

Figure 3B:
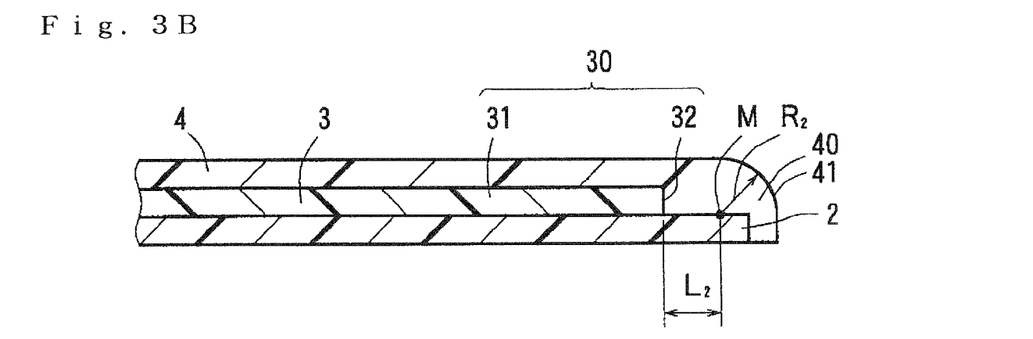
FIG. 3B is an enlarged plan view schematically showing the transmission of light beams in the above-mentioned optical waveguide for the touch panel when the light beams are received.

In the L-shaped optical waveguide B which receives the light beams W, as illustrated in FIG. 3B, the light beams W having traveled over the display screen of the above-mentioned display 11 (see FIG. 2) pass through an end portion [see FIG. 1C] of the over cladding layer 4, and thereafter enter each of the cores 3 through the end surface (arcuately curved surface 32 in plan view) of each of the cores 3. At this time, the above-mentioned light beams W are further horizontally converged by refraction through the lens portion 30 formed in the end portion of each of the cores 3. Specifically, the light beams W entering through the end surface of each of the cores 3 are received by the arcuately curved surface 32 in plan-view which is formed wide, are reflected gently inwardly because of the configuration of the arcuately curved surface 32 in plan view, and travel from an increasing-width tip portion toward the interior of each of the cores 3 having a narrow optical passage. At this time, the light beams W are converged as the light beams W travel, and the converged light beams w travel in each of the cores 3.

Since such optical transmission is done between the two L-shaped optical waveguides A and B shown in FIG. 2, the two L-shaped optical waveguides A and B described above cause the light beams W to travel in a lattice form on the display screen of the display 11 of the touch panel 10 as shown while the horizontal divergence of the light beams W is suppressed (although only some of the light beams W forming the lattice are shown in FIG. 2 for ease of understanding). Thus, when the display screen of the display 11 is touched with a finger in this state, the position of a portion touched with the finger is precisely detected.

The dimensions and the like of the above-mentioned L-shaped optical waveguides A and B may be determined to conform to the size of the display 11 of the touch panel 10. For example, the lengths of two elongated portions of the L-shaped optical waveguides A and B are on the order of 30 to 300 mm, and the widths of the two elongated portions thereof are on the order of 50 μm to 2 mm. The number of light-emitting (light-receiving) cores 3 may be determined according to the number of operation details to be displayed on the display screen of the display 11, and is, for example, on the order of 20 to 100.

Next, an exemplary manufacturing method of such an optical waveguide for a touch panel according to the present invention will be described. FIGS. 4A to 4D to which reference is made in this description show the manufacturing method mainly about the lens portion 30 shown in FIGS. 1B and 1C and a peripheral portion thereof.

Figure 4A:
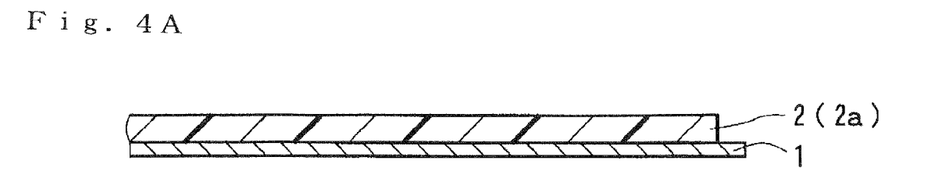
FIGS. 4A to 4D are views schematically illustrating the steps of forming an over cladding layer in a manufacturing method of the above-mentioned optical waveguide for the touch panel.

First, a base t of a flat shape [see FIG. 4A] for use in the manufacture of the above-mentioned optical waveguides A and B for the touch panel (see FIG. 1A to 1C) is prepared. Examples of a material for the formation of the base 1 include glass, quartz, silicon, resins, metals and the like. The thickness of the base 1 is, for example, in the range of 20 µm (for a film-like base 1) to 5 mm (for a plate-like base 1).

Next, as shown in FIG. 4A, a varnish prepared by dissolving a photosensitive resin in a solvent, which serves as a material for the formation of the under cladding layer 2, is applied to a predetermined region on the above-mentioned base 1. The application of the varnish is achieved, for example, by a spin coating method, a dipping method, a casting method, an injection method, an ink jet method and the like. Then, the varnish is dried by a heating treatment at 50° C. to 120° C. for 10 to 30 minutes. This provides a photosensitive resin layer 2a which is to be formed into the under cladding layer 2.

Next, the above-mentioned photosensitive resin layer 2a is exposed to irradiation light. Examples of the irradiation light for the above-mentioned exposure used herein include visible light, ultraviolet light, infrared light, X-rays, alpha rays, beta rays, gamma rays and the like. Preferably, ultraviolet light is used. This is because the use of ultraviolet light achieves irradiation with large energy to provide a high rate of hardening, and an irradiation apparatus therefor is small in size and inexpensive to achieve the reduction in production costs. A light source of the ultraviolet light may be, for example, a low-pressure mercury-vapor lamp, a high-pressure mercury-vapor lamp, an ultra-high-pressure mercury-vapor lamp and the like. The dose of the ultraviolet light is typically 10 to 10000 mJ/cm$^2$, preferably 50 to 3000 mJ/cm$^2$.

After the above-mentioned exposure, a heating treatment is performed to complete a photo reaction. This heating treatment is performed at 80° C. to 250° C., preferably at 100° C. to 200° C., for 10 seconds to two hours, preferably for five minutes to one hour. This forms the above-mentioned photosensitive resin layer 2a into the under cladding layer 2. The thickness of the under cladding layer 2 (the photosensitive resin layer 2a) is typically in the range of 1 to 50 µm, preferably in the range of 5 to 30 µm.

Figure 4B:
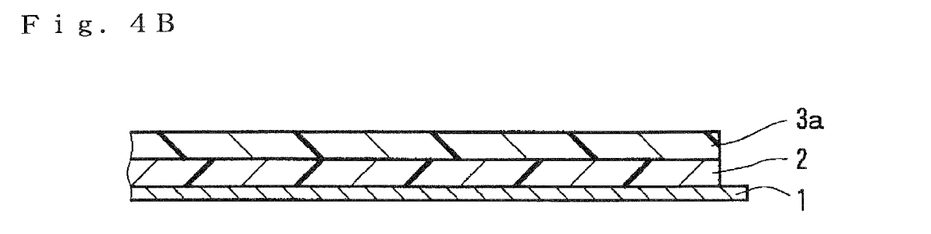

Next, as shown in FIG. 4B, a photosensitive resin layer 3a which is to be formed into the cores 3 is formed on the surface of the above-mentioned under cladding layer 2. The formation of this photosensitive resin layer 3a is carried out in a manner similar to the method for the formation of the photosensitive resin layer 2a formed into the under cladding layer 2 described with reference to FIG. 4A. The material for the formation of the cores 3 used herein is a material having a refractive index greater than that of the materials for the formation of the above-mentioned under cladding layer 2 and the over cladding layer 4 [see FIG. 4D] to be described later. The adjustment of this refractive index may be made, for example, by adjusting the selection of the types of the materials for the formation of the above-mentioned under cladding layer 2, the cores 3 and the over cladding layer 4 and the composition ratio thereof.

Next, an exposure mask formed with an opening pattern corresponding to the pattern of the cores 3 (including the lens portion 30) is placed over the above-mentioned photosensitive resin layer 3a. Then, the above-mentioned photosensitive resin layer 3a is exposed to irradiation light through the exposure mask. Thereafter, a heating treatment is performed.

The exposure and the heating treatment are carried out in a manner similar to the method for the formation of the under cladding layer 2 described with reference to FIG. 3A.

Subsequently, development is performed using a developing solution to dissolve away an unexposed portion of the above-mentioned photosensitive resin layer 3a [see FIG. 4B], thereby forming the photosensitive resin layer 3a remaining on the under cladding layer 2 into the pattern of the cores 3, as shown in FIG. 40. In this process, one end portion of each of the cores 3 is in the form of the lens portion 30. The above-mentioned development employs, for example, an immersion method, a spray method, a puddle method and the like. Examples of the developing solution used herein include an organic solvent, an organic solvent containing an alkaline aqueous solution, and the like. The developing solution and conditions for the development are selected as appropriate depending on the composition of a photosensitive resin composition.

After the above-mentioned development, the developing solution in the remaining photosensitive resin layer 3a formed in the pattern of the cores 3 is removed by a heating treatment. This heating treatment is typically performed at 80° C. to 120° C. for 10 to 30 minutes. Thus, the remaining photosensitive resin layer 3a formed in the pattern of the cores 3 is formed into the cores 3. The thickness of the cores 3 (the photosensitive resin layer 3a) is typically in the range of 20 to 150 µm, preferably in the range of 40 to 100 µm. The width of the cores 3 (except the lens portion 30) is typically in the range of 8 to 50 µm, preferably in the range of 10 to 25 µm.

Figure 4C:
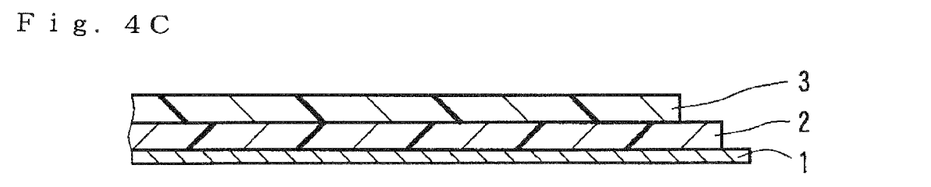
Figure 4D:
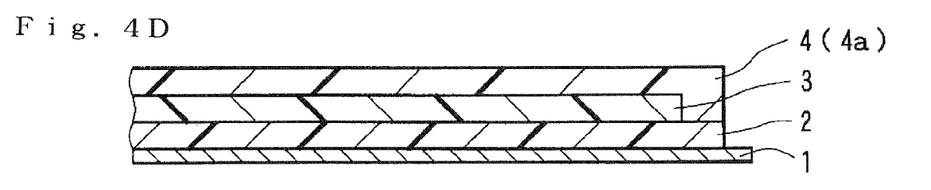

Then, as shown in FIG. 4D, a photosensitive resin layer 4a which is to be formed into the over cladding layer 4 is formed on the surface of the above-mentioned under cladding layer 2 so as to cover the above-mentioned cores 3. The formation of this photosensitive resin layer 4a is carried out in a manner similar to the method for the formation of the photosensitive resin layer 2a formed into the under cladding layer 2 described with reference to FIG. 4A. Thereafter, the exposure and the heating treatment are carried out in a manner similar to the method for the formation of the under cladding layer 2 to form the over cladding layer 4. The thickness of the over cladding layer 4 (the photosensitive resin layer 4a) (a thickness as measured from the surface of the cores 3) is typically in the range of 5 to 100 µm, preferably in the range of 10 to 80 µm.

Subsequently, the base 1 is removed from the under cladding layer 2. An example of the method for the removal is as follows. A lower surface of the base 1 is brought into contact with an upper surface of a vacuum suction stage (not shown), and the base 1 is fixed thereon by air suction. Next, a vacuum suction machine (not shown) adheres to an upper surface of the over cladding layer 4 under suction to lift an adhering portion thereof in this state. This removes the under cladding layer 2 of the optical waveguide for the touch panel from the base 1, with the cores 3 and the under cladding layer 2 as well as the over cladding layer 4 bonded together. The adhesive force between the base 1 and the under cladding layer 2 is smaller than the adhesive forces between the over cladding layer 4 and the cores 3 and between the over cladding layer 4 and the under cladding layer 2 because of the materials thereof. Thus, the above-mentioned process easily removes the base 1 from the under cladding layer 2.

Then, portions which become the two L-shaped optical waveguides A and B described above are cut by punching using a blade and the like. This provides optical waveguides for a touch panel which include the two L-shaped optical waveguides A and B shown in FIGS. 1A and 1B.

In the above-mentioned preferred embodiment, the lens portion 30 formed in the end portion of each of the cores 3 is positioned inside the over cladding layer 4. However, the tip portion or the whole of the lens portion 30 may be exposed without being covered with the over cladding layer 4.

Figure 5A:
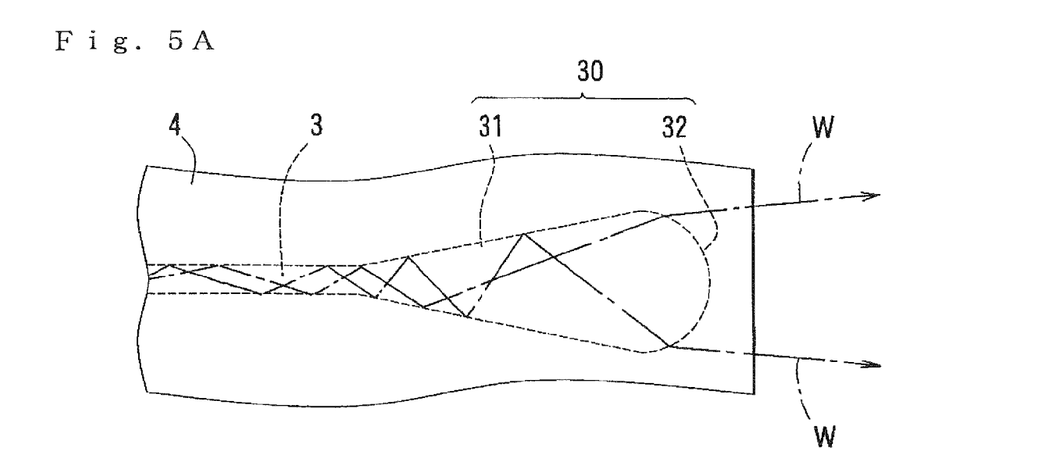
FIG. 5A is a plan view schematically showing the end portion of the core of the optical waveguide for the touch panel according to a second preferred embodiment of the present invention.
Figure 5B:
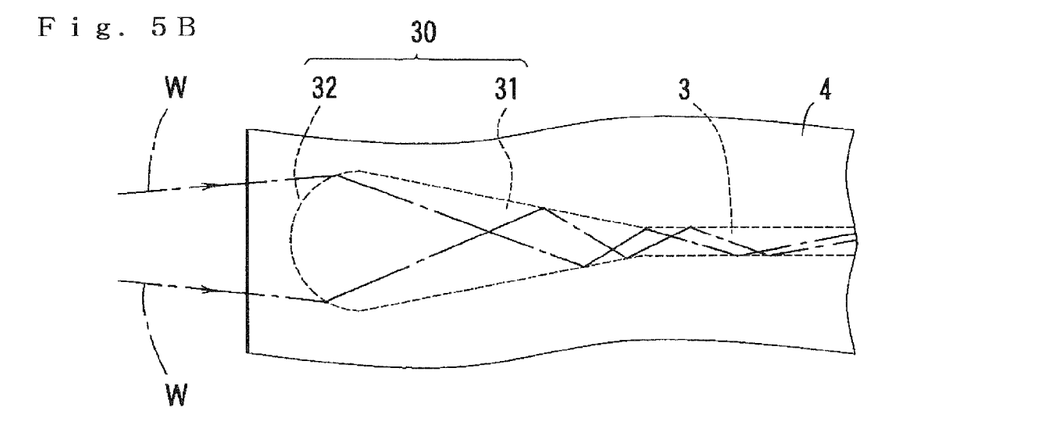
FIG. 5B is a sectional view taken along the line X-X of FIG. 5A.

FIGS. 5A and 5B show the optical waveguide for the touch panel according to a second preferred embodiment of the present invention. The optical waveguide for the touch panel according to the second preferred embodiment is such that an end portion of the over cladding layer 4 which covers the front of the lens portion 30 of each of the cores 3 in the first preferred embodiment is formed as a second lens portion 40. An end surface of the second lens portion 40 is formed as a quadrantal curved surface 41 in side view which bulges outwardly. The dimensions of the second lens portion 40 are set so that a distance ($L_2$) from the tip of the lens portion 30 (or the tip of the arcuately curved surface 32 in plan view) formed in the end portion of each of the cores 3 to the center M of curvature of the quadrantal curved surface 41 in side view and the radius ($R_2$) of curvature of the quadrantal curved surface 41 in side view satisfy the following condition (B). Except for this, the second preferred embodiment is similar to the first preferred embodiment. Like reference numerals and characters are used in the second preferred embodiment to designate parts similar to those of the first preferred embodiment.

$$(L_2/2)-0.3 < R_2 < (L_2/2)+0.3 \quad (B)$$

[where $L_2$ is in mm, and $R_2$ is in mm]

The light beams W emitted from the lens portion 30 formed in the end portion of each of the cores 3 (the light beams W restrained from diverging horizontally) are restrained from diverging vertically in a direction perpendicular to the longitudinal direction of the under cladding layer 2 as seen in FIG. 5B) by refraction through the above-mentioned second lens portion 40 formed in the end portion of the over cladding layer 4. When the light beams W are received, the light beams W are narrowed down and converged vertically by refraction through the second lens portion 40, and enter each of the cores 3 through the end surface (arcuately curved surface 32 in plan view) of each of the cores 3 in that state (and the light beams W are narrowed down and converged horizontally at this time). This increases optical transmission efficiency to improve the precision of the finger detection in the touch panel 10 (see FIG. 2).

Figure 6:
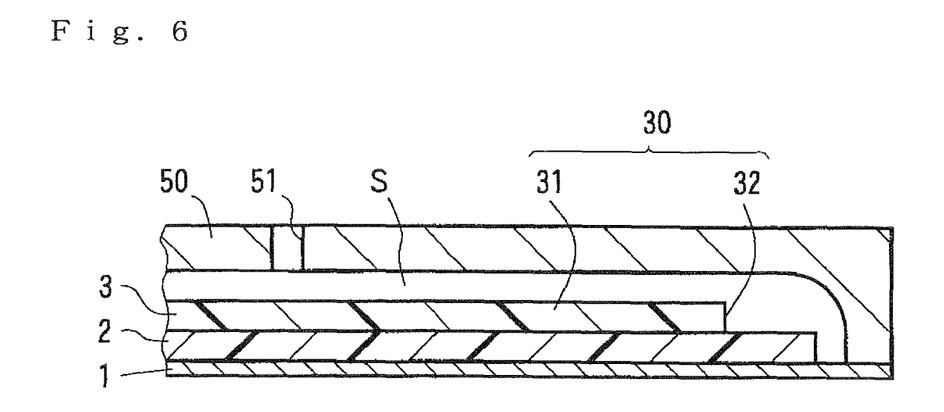
FIG. 6 is a view schematically illustrating the manufacturing method of the above-mentioned optical waveguide for the touch panel.

A manufacturing method of such an optical waveguide for a touch panel is as follows. The step of forming the cores 3 and its preceding steps are similar to those of the first preferred embodiment, as shown in FIGS. 4A to 4C. The subsequent step of forming the over cladding layer 4 is as follows. First, as shown in FIG. 6, a molding die 50 is used which is made of quartz (a material permeable to irradiation light such as ultraviolet light and the like) and which is formed with a recessed portion having a die surface complementary in shape to the surface (including the second lens portion 40) of the over cladding layer 4 [see FIG. 5B]. An opening surface of the recessed portion is positioned in a predetermined position of the surface of the base 1, and the molding die 50 is brought into intimate contact with the surface of the base 1. Next, a photosensitive resin for the formation of the over cladding layer 4 is charged through an inlet 51 formed in the above-mentioned molding die 50 into a space (a mold space S) surrounded by the die surface of the above-mentioned recessed portion and the surfaces of the base 1, the under cladding layer 2 and the cores 3. Exposure to irradiation light such as ultraviolet light and the like is performed through the above-mentioned molding die 50 in a manner similar to that in the first preferred embodiment. After the molding die 50 is removed, a heating treatment or the like is performed to form the over cladding layer 4 (including the second lens portion 40) [see FIG. 5B]. The subsequent steps are performed in a manner similar to that in the first preferred embodiment. Thus, the optical waveguide for the touch panel [see FIG. 5B] is manufactured.

In the above-mentioned preferred embodiments, the formation of the under cladding layer 2 and the over cladding layer 4 uses the photosensitive resin as the materials thereof, and is achieved by exposure and development. However, other materials and other methods may be used. As an example, the formation of the under cladding layer 2 and the over cladding layer 4 may use a thermosetting resin such as polyimide resin and epoxy resin as the materials thereof, and may be achieved by applying a varnish prepared by dissolving the thermosetting resin in a solvent and then performing a heating treatment (typically at 300° C. to 400° C. for 60 to 180 minutes) to set the varnish.

In the above-mentioned preferred embodiments, the photosensitive resin is used to form the under cladding layer 2, but other materials may be used. A resin film may be used as the under cladding layer 2. Alternatively, a substrate with a metal film or a metal thin film formed on the surface thereof may be used in place of the under cladding layer 2 so that the surface of the metal material functions as a surface for reflecting the light beams W propagating inside the cores 3.

In the above-mentioned preferred embodiments, the optical waveguide for the touch panel includes the two L-shaped optical waveguides A and B. However, the two L-shaped optical waveguides A and B may be integrated at their opposite ends together into a rectangular frame-shaped configuration. The manufacturing method thereof includes the step of cutting into the rectangular frame-shaped configuration in place of the step of cutting into two L-shaped configurations in the above-mentioned manufacturing method of the optical waveguide for the touch panel.

When a film-like base is used as the base 1 in the above-mentioned manufacturing method of the optical waveguide for the touch panel, the film-like base 1 may be removed from the under cladding layer 2 after the cutting into the above-mentioned L-shaped configurations together with the film-like base 1. Alternatively, the base 1 may be used together with the optical waveguide for the touch panel without being removed.

Next, inventive examples of the present invention will be described in conjunction with comparative examples. It should be noted that the present invention is not limited to the inventive examples.

EXAMPLES

Inventive Examples 1 to 18 and Comparative Examples 1 to 10

Material for Formation of Under Cladding Layer and Over Cladding Layer

A material for formation of an under cladding layer and an over cladding layer was prepared by mixing 35 parts by weight of bisphenoxyethanol fluorene glycidyl ether (component A) represented by the following general formula (1), 40 parts by weight of 3',4'-epoxycyclohexylmethyl-3,4-epoxycyclohexane carboxylate which is an alicyclic epoxy resin (CELLOXIDE 2021P manufactured by Daicel Chemical Industries, Ltd.)(Component B), 25 parts by weight of (3',4'-epoxycyclohexane)methyl-3',4'-epoxycyclohexyl-carboxylate (CELLOXIDE 2081 manufactured by Daicel Chemical Industries, Ltd.) (Component C), and 2 parts by weight of a 50% propione carbonate solution of 4,4'-bis[di(β-hydroxyethoxy)phenylsultinio]phenyl-sulfide-bis-hexafluoroantimonate (component D).

The dimensions of a core portion other than the lens portion in cross section were 12 μm in width×24 μm in height. The above-mentioned dimensions were measured with an SEM (electron microscope). The refractive index of the cores at a wavelength of 830 nm was 1.588.

$$\text{(1)}\quad \overset{O}{\triangle}\!\!-CH_2-(OCHCH_2)_n\!\!-\!\!O\!\!-\!\!\underset{R_2}{\overset{R_1}{\bigcirc}}\!\!-\!\!\underset{R_3}{\overset{R_4}{\bigcirc}}\!\!-\!\!O-(CH_2CHO)_n-CH_2-\overset{O}{\triangle}$$

wherein $R_1$ to $R_6$ are hydrogen atoms, and n=1.

Material for Formation of Cores

A material for formation of cores was prepared by dissolving 70 parts by weight of the aforementioned component A, 30 parts by weight of 1,3,3-tris{4-[2-(3-oxetanyl)]butoxyphenyl}butane and one part by weight of the aforementioned component D in 28 parts by weight of ethyl lactate.

Production of optical Waveguide for Touch Panel

The material for the formation of the above-mentioned under cladding layer was applied to the surface of a polyethylene naphthalate (PEN) film [100 mm×100 mm×188 μm (thickness)] by a spin coating method. Thereafter, exposure by the use of irradiation with ultraviolet light at 2000 mJ/cm² was performed. Subsequently, a heating treatment was performed at 100° C. for 15 minutes to form the under cladding layer. The thickness of this under cladding layer was 25 μm when measured with a contact-type film thickness meter. The refractive index of this under cladding layer at a wavelength of 830 nm was 1.542.

Next, the material for the formation of the above-mentioned cores was applied to the surface of the above-mentioned under cladding layer by a spin coating method. Thereafter, a drying process was performed at 100° C. for 15 minutes. Next, a synthetic quartz chrome mask (exposure mask) formed with an opening pattern identical in shape with a core pattern (including a lens portion) was placed over the resulting core material. Then, exposure by the use of irradiation with ultraviolet light at 4000 mJ/cm² was performed by a contact exposure method from over the mask. Thereafter, a heating treatment was performed at 120° C. for 15 minutes. Next, development was carried out using an aqueous solution of γ-butyrolactone to dissolve away an unexposed portion. Thereafter, a heating treatment was performed at 120° C. for 30 minutes to form the cores. The dimensions of the lens portion of each of the cores [the length (L) of the tapered portion 31, the taper angle (α) and the radius (R) of curvature of the arcuately curved surface of the end surface] were set at values listed in Tables 1 to 5 below (in Inventive Examples 1 to 18 and Comparative Examples 1 to 10) by the use of the above-mentioned chrome mask (exposure mask) formed with an opening pattern corresponding to the dimensions thereof.

Next, the material for the formation of the above-mentioned over cladding layer was applied to the surface of the above-mentioned under cladding layer by a spin coating method so as to cover the above-mentioned cores. Then, exposure by the use of irradiation with ultraviolet light at 2000 mJ/cm² was performed. Subsequently, a heating treatment was performed at 150° C. for 60 minutes to thereby form the over cladding layer. The thickness of the over cladding layer was 60 μm when measured with a contact-type film thickness meter. The refractive index of the over cladding layer at a wavelength of 830 nm was 1.542.

Thereafter, the above-mentioned PEN film was removed from the under cladding layer. This provided an optical waveguide.

Evaluation of Divergence of Emitted Light Beam

Light beams having a wavelength of 635 nm were caused to enter a core of each resultant optical waveguide through its first end surface (the end surface opposite from the lens portion) and to emit the light beams from the lens portion. A screen was placed upright 60 mm ahead of the tip of the end surface of the lens portion, and the width of a region irradiated with the above-mentioned light beams on the screen was measured with a digital vernier caliper. As a result, the width of the irradiated region which is less than 15 mm was evaluated as exhibiting an appropriate divergence of the emitted light beams (indicated by an open circle), and the width of the irradiated region which is not less than 15 mm was evaluated as exhibiting a great divergence of the emitted light beams (indicated by a cross) The results of the evaluation were also shown in Tables 1 and 5 below.

TABLE 1

| | | Inventive Examples | | | | | |
|---|---|---|---|---|---|---|---|
| | | 1 | 2 | 3 | 4 | 5 | 6 |
| Lens Portion | Length of Tapered Portion: L (μm) | 400 | | | 600 | | |
| | Taper Angle: α (Degree) | 4 | 10 | 16 | 4 | 10 | 16 |
| | Radius of Curvature: R(μm) | 25 | 60 | 70 | 50 | 68 | 100 |

TABLE 1-continued

|  |  | Inventive Examples | | | | | |
| --- | --- | --- | --- | --- | --- | --- | --- |
|  |  | 1 | 2 | 3 | 4 | 5 | 6 |
| $0.5 \times L \times \tan(\alpha/2)$ | | 7 | 17 | 28 | 10 | 26 | 42 |
| $2.5 \times L \times \tan(\alpha/2)$ | | 35 | 87 | 141 | 52 | 131 | 211 |
| Irradiated Region | Width (mm) | 13.8 | 9.8 | 13.5 | 12.2 | 8.0 | 12.3 |
| | Evaluation | ○ | ○ | ○ | ○ | ○ | ○ |

TABLE 2

|  |  | Inventive Examples | | | | | |
| --- | --- | --- | --- | --- | --- | --- | --- |
|  |  | 7 | 8 | 9 | 10 | 11 | 12 |
| Lens Portion | Length of Tapered Portion: L (μm) | | 790 | | | 800 | |
| | Taper Angle: α (Degree) | 4 | 10 | 16 | 2 | 9 | 20 |
| | Radius of Curvature: R (μm) | 65 | 85 | 160 | 65 | 90 | 150 |
| $0.5 \times L \times \tan(\alpha/2)$ | | 14 | 35 | 56 | 7 | 31 | 71 |
| $2.5 \times L \times \tan(\alpha/2)$ | | 69 | 173 | 278 | 35 | 157 | 353 |
| Irradiated Region | Width (mm) | 9.2 | 8.0 | 10.5 | 13.8 | 8.0 | 13.5 |
| | Evaluation | ○ | ○ | ○ | ○ | ○ | ○ |

TABLE 3

|  |  | Inventive Examples | | | | | |
| --- | --- | --- | --- | --- | --- | --- | --- |
|  |  | 13 | 14 | 15 | 16 | 17 | 18 |
| Lens Portion | Length of Tapered Portion: L (μm) | | 5000 | | | 10000 | |
| | Taper Angle: α (Degree) | 2 | 9 | 20 | 2 | 9 | 20 |
| | Radius of Curvature: R (μm) | 210 | 540 | 700 | 420 | 800 | 1500 |
| $0.5 \times L \times \tan(\alpha/2)$ | | 44 | 197 | 441 | 87 | 394 | 882 |
| $2.5 \times L \times \tan(\alpha/2)$ | | 218 | 983 | 2204 | 436 | 1968 | 3514 |
| Irradiated Region | Width (mm) | 3.6 | 4.8 | 8.8 | 2.0 | 8.0 | 8.7 |
| | Evaluation | ○ | ○ | ○ | ○ | ○ | ○ |

TABLE 4

|  |  | Comparative Examples | | | | |
| --- | --- | --- | --- | --- | --- | --- |
|  |  | 1 | 2 | 3 | 4 | 5 |
| Lens Portion | Length of Tapered Portion: L (μm) | | 300 | | | 600 |
| | Taper Angle: α (Degree) | 10 | 2 | 18 | 2 | 18 |
| | Radius of Curvature: R (μm) | 45 | 30 | 60 | 25 | 150 |
| $0.5 \times L \times \tan(\alpha/2)$ | | 13 | 3 | 26 | 5 | 48 |
| $2.5 \times L \times \tan(\alpha/2)$ | | 66 | 13 | 132 | 26 | 238 |
| Irradiated Region | Width (μm) | 16.4 | 26.2 | 18.4 | 18.6 | 20.3 |
| | Evaluation | X | X | X | X | X |

TABLE

|  |  | Comparative Examples | | | | |
| --- | --- | --- | --- | --- | --- | --- |
|  |  | 6 | 7 | 8 | 9 | 10 |
| Lens Portion | Length of Tapered Portion: L (μm) | | 780 | | | 1000 |
| | Taper Angle: α (Degree) | 3 | 1 | 22 | 1 | 22 |
| | Radius of Curvature: R (μm) | 27 | 12 | 365 | 25 | 350 |
| $0.5 \times L \times \tan(\alpha/2)$ | | 10 | 3 | 76 | 4 | 97 |
| $2.5 \times L \times \tan(\alpha/2)$ | | 51 | 15 | 379 | 22 | 486 |
| Irradiated Region | Width (mm) | 16.5 | 31.4 | 30.2 | 36.2 | 26.3 |
| | Evaluation | X | X | X | X | X |

The fore going results show that, because the optical waveguides according to Inventive Examples 1 to 18 suppress the divergence of the emitted light beams as compared with those according to Comparative Examples 1 to 10, the use of the optical waveguides according to Inventive Examples 1 to 18 as the optical waveguide for the touch panel achieves optical transmission between the light-emitting optical waveguide and the light-receiving optical waveguide with appropriate optical transmission efficiency.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. An optical waveguide for a touch panel, comprising:
a body;
a plurality of cores formed on a predetermined portion of a surface of the body, the plurality of cores including a light-emitting core and a light-receiving core; and
an over cladding layer formed on the surface of said body so as to cover the plurality of cores,
the optical waveguide being provided along a peripheral portion of a display screen of a display of the touch panel,
the light-emitting core including an end portion positioned in a first side portion of the display screen of said display, the light-receiving core including an end portion positioned in a second side portion of the display screen of said display,
each of the end portion of the light-emitting core and the end portion of the light-receiving core being formed as a lens portion,
the lens portion having a tapered portion such that the width thereof gradually increases toward an end surface thereof,
said end surface being formed as an arcuately curved surface in plan view which bulges outwardly,
wherein the length (L) of said tapered portion, a taper angle (α) and the radius (R) of curvature of the arcuately curved surface in plan view satisfy the following conditions (a) to (c):
(a) $800\ \mu m \leq L$
(b) $2° \leq α \leq 20°$
(c) $0.5 \times L \times \tan(α/2) < R < 2.5 \times L \times \tan(α/2)$
where L is in μm, α is in degrees, and R is in μm.

2. The optical waveguide for the touch panel according to claim 1, wherein said body is formed of an under cladding material or a metal material.

3. An optical waveguide for a touch panel, comprising:
a body;
a plurality of cores formed on a predetermined portion of a surface of the body, the plurality of cores including a light-emitting core and a light-receiving core; and
an over cladding layer formed on the surface of said body so as to cover the plurality of cores,
the optical waveguide being provided along a peripheral portion of a display screen of a display of the touch panel,
the light-emitting core including an end portion positioned in a first side portion of the display screen of said display,
the light-receiving core including an end portion positioned in a second side portion of the display screen of said display,
each of the end portion of the light-emitting core and the end portion of the light-receiving core being formed as a lens portion,
the lens portion having a tapered portion such that the width thereof gradually increases toward an end surface thereof,
said end surface being formed as an arcuately curved surface in plan view which bulges outwardly,
wherein the length (L) of said tapered portion, a taper angle (α) and the radius (R) of curvature of the arcuately curved surface in plan view satisfy the following conditions (d) to (f):
(d) $400\ \mu m \leq L < 800\ \mu m$
(e) $4° \leq α \leq 16°$
(f) $0.5 \times L \times \tan(α/2) < R < 2.5 \times L \times \tan(α/2)$
where L is in μm, α is in degrees, and R is in μm.

4. The optical waveguide for the touch panel according to claim 3, wherein said body is formed of an under cladding material or a metal material.

5. A touch panel comprising:
a display including a display screen; and
an optical waveguide including a body, a plurality of cores formed on a predetermined portion of a surface of the body, the plurality of cores including a light-emitting core and a light-receiving core, and an over cladding layer formed on the surface of said body so as to cover the plurality of cores,
the optical waveguide being provided along a peripheral portion of the display screen of the display of the touch panel,
the light-emitting core including an end portion positioned in a first side portion of the display screen of said display,
the light-receiving core including an end portion positioned in a second side portion of the display screen of said display,
each of the end portion of the light-emitting core and the end portion of the light-receiving core being formed as a lens portion,
the lens portion having a tapered portion such that the width thereof gradually increases toward an end surface thereof,
said end surface being formed as an arcuately curved surface in plan view which bulges outwardly,
wherein the length (L) of said tapered portion, a taper angle (α) and the radius R) of curvature of the arcuately curved surface in plan view satisfy the following conditions (a) to (c):
(a) $800\ \mu m \leq L$
(b) $2° \leq α \leq 20°$
(c) $0.5 \times L \times \tan(α/2) < R < 2.5 \times L \times \tan(α/2)$
where L is in μm, α is in degrees, and R is in μm.

6. A touch panel comprising:
a display including a display screen; and
an optical waveguide including a body, a plurality of cores formed on a predetermined portion of a surface of the body, the plurality of cores including a light-emitting core and a light-receiving core, and an over cladding layer formed on the surface of said body so as to cover the plurality of cores,
the optical waveguide being provided along a peripheral portion of the display screen of the display of the touch panel,
the light-emitting core including an end portion positioned in a first side portion of the display screen of said display,
the light-receiving core including an end portion positioned in a second side portion of the display screen of said display,
each of the end portion of the light-emitting core and the end portion of the light-receiving core being formed as a lens portion,
the lens portion having a tapered portion such that the width thereof gradually increases toward an end surface thereof,
said end surface being formed as an arcuately curved surface in plan view which bulges outwardly,
wherein the length (L) of said tapered portion, a taper angle (α) and the radius (R) of curvature of the arcuately curved surface in plan view satisfy the following conditions (d) to (f):
(d) $400\ \mu m \leq L < 800\ \mu m$
(e) $4° \leq α \leq 16°$
(f) $0.5 \times L \times \tan(α/2 < R < 2.5 \times L \times \tan(α/2)$
where L is in μm, α is in degrees, and R is in μm.

* * * * *